United States Patent
Burket et al.

(10) Patent No.: US 9,745,220 B2
(45) Date of Patent: Aug. 29, 2017

(54) ETCH RATE ENHANCEMENT AT LOW TEMPERATURES

(71) Applicant: Corning Incorporated, Corning, NY (US)

(72) Inventors: Robert Carl Burket, Elkland, PA (US); Benedict Yorke Johnson, Horseheads, NY (US); Samuel Odei Owusu, Horseheads, NY (US); Tammy Lynn Petriwsky, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/899,602

(22) PCT Filed: Jun. 20, 2014

(86) PCT No.: PCT/US2014/043316
§ 371 (c)(1),
(2) Date: Dec. 18, 2015

(87) PCT Pub. No.: WO2014/205301
PCT Pub. Date: Dec. 24, 2014

(65) Prior Publication Data
US 2016/0145149 A1    May 26, 2016

Related U.S. Application Data

(60) Provisional application No. 61/837,887, filed on Jun. 21, 2013, provisional application No. 61/898,469, filed on Oct. 31, 2013.

(51) Int. Cl.
*B44C 1/22* (2006.01)
*C23F 1/00* (2006.01)
*C03C 15/00* (2006.01)
*C03C 25/68* (2006.01)
*C25F 3/00* (2006.01)

(52) U.S. Cl.
CPC .................................. *C03C 15/00* (2013.01)

(58) Field of Classification Search
USPC ........................................................ 216/97
See application file for complete search history.

(56) References Cited

U.S. PATENT DOCUMENTS 8,216,911 B2    7/2012    Rana

FOREIGN PATENT DOCUMENTS

| CN | 101215099 A | 7/2008 |
| CN | 101481215 A | 7/2009 |
| CN | 102643027 A | 8/2012 |
| KR | 2000003163 A | 1/2000 |

OTHER PUBLICATIONS

MicroChemicals; "Aluminium Etching"; www.microchemicals.com/downloads/application_notes.html (Nov. 7, 2013); pp. 1-3.
Spierings; "Wet chemical etching of silicate glasses in hydrofluoric acid based solutions"; Journal of Materials Science 28 (1993); pp. 6261-6273.

*Primary Examiner* — Roberts Culbert

(57) ABSTRACT

A method etching a glass material comprises providing an etchant comprising 10-30% HF, 5-15% $HNO_3$, and at least 10% $H_3PO_4$ by volume constituted such that the ratio $HF:HNO_3$ by volume is in the range of 1.7:1 to 2.3:1, providing a glass material to be etched, and contacting the glass material with the etchant. The etchant desirably has no other acid components. The method may be performed with the etchant temperature within the range of 20-30° C. The glass material may be an aluminosilicate glass. Ultrasound energy may be applied to the etchant, to the glass material, or both.

8 Claims, No Drawings

ETCH RATE ENHANCEMENT AT LOW TEMPERATURES

PRIORITY

This application claims the benefit of priority under 35 U.S.C. §371 of International Patent Application Ser. No. PCT/US14/43316, filed on Jun. 20, 2014, which claims the benefit of priority under 35 U.S.C. §119 of U.S. Provisional Application Ser. No. 61/837,887, filed on Jun. 21, 2013, and of U.S. Provisional Application Ser. No. 61/898,469, filed on Oct. 31, 2013, the contents of which are relied upon and incorporated herein by reference in their entireties.

BACKGROUND

Field

The subject matter of the present disclosure generally relates to etch processes and materials for increasing the etch rate of glass wet etch processes without increasing the temperature of the etchant, and more specifically to increasing the etch rate of glass wet etch processes without increasing the temperature or the hydrofluoric acid content of the etchant, particularly for aluminosilicate glasses.

Technical Background

Wet chemical etching of silicate glass in aqueous hydrofluoric (HF) acid solutions has been studied for many years. General industry practice usually involves the use of a binary mixture of HF and a strong secondary mineral acid, such as hydrochloric acid (HCl), sulfuric acid ($H_2SO_4$), and nitric acid ($HNO_3$), among others. The addition of these secondary acids generally enhances the rate of etching.

HF dissolved in water is a weak acid. Solutions of HF are known to contain H+, F−, HF2-ions and un-dissociated HF molecules. However, HF is the best performing, or one of the best performing chemicals, in terms of the ability to appreciably dissolve silica-containing materials such as glass. As a result, and despite the expense and effort necessary to successfully manage the significant and well-known environmental and health risks associated with its use, HF is widely utilized for many applications where silica and other like materials are to be cleaned or dissolved.

For a given glass composition, the basic factors that affect the rate of etching of glass include the concentration of HF acid, the etchant temperature, and the presence and amount of physical agitation (whether by flow, stirring, application of acoustic energy, or other means). Increasing HF acid concentration generally increases the etch rate at a given constant temperature. Similarly, if HF acid concentration is held constant, increasing the temperature will also increase the etch rate. In most industrial applications, a high etch rate is usually necessary to enable an acceptably high throughput to be achieved. This is usually accomplished by using an elevated process temperature (a heated etchant) and/or by using an etchant with relatively high HF concentration.

Etchants with higher HF concentration increase the corrosion rate of most metal alloys, namely, bolts, rivets and any other similar degradable components within etch systems and within associated vapor recovery systems. In some cases certain types of heaters and/or chillers, which have to be immersed in the etching solution to enhance their heat transfer effectiveness, also fall prey to the harsh acid concentration, resulting in the need for frequent system maintenance to ensure that equipment integrity is not compromised. Also, at increased HF concentrations, the rate of evaporation of HF increases. This requires the use of enhanced-performance vapor recovery and safety systems to prevent hazardous gasses from escaping.

Similar issues arise if etchant temperature is increased. In addition to increased rate of corrosion of degradable components of the system, the rate of evaporation of gases increases with increase in temperature, requiring enhanced vapor recovery and safety units and more frequent maintenance in order to ensure continuous and safe operation.

In accord with the foregoing, it would be desirable achieve an increase in glass etch rates without having to increase etchant temperature and/or HF concentration.

BRIEF SUMMARY

Corning has previously developed acid etching processes that utilize mixtures of HF and $HNO_3$ (and water) for etching glass. The present disclosure provides improved etchants comprising mixtures of HF and $HNO_3$ and phosphoric acid ($H_3PO_4$), allowing the process to be operated at lower temperatures and at lower HF concentrations while still achieving a high etch rate, relative to mixtures of HF and $HNO_3$.

According to one aspect of the present disclosure, a method is disclosed of etching a glass material. The method comprises providing an etchant comprising 10-30% HF, 5-15% $HNO_3$, and at least 10% $H_3PO_4$ by volume constituted such that the ratio HF:$HNO_3$ by volume is in the range of 1.7:1 to 2.3:1, providing a glass material to be etched, and contacting the glass material with the etchant. The etchant desirably has no other acid components. The method may be performed with the etchant temperature within the range of 20-30° C. The glass material may be an aluminosilicate glass. Ultrasound energy may be applied to the etchant, to the glass material, or both. The disclosed method allows for etching at the same rate as heated and agitated (with ultrasound) mixtures of HF and $HNO_3$, but without at least one of either heating or agitation.

Additional features and advantages of the technology disclosed herein will be set forth in the detailed description which follows, and in part will be readily apparent to those skilled in the art from that description or recognized by practicing the technology as described herein, including the detailed description which follows and the claims.

It is to be understood that both the foregoing general description and the following detailed description present embodiments of the technology, and are intended to provide an overview or framework for understanding the nature and character of the technology as it is claimed, and to explain the principles and operations of the technology. Additionally, the descriptions are meant to be merely illustrative, and are not intended to limit the scope of the claims in any manner.

DETAILED DESCRIPTION

For the purposes of describing and defining the present disclosure it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

According to one embodiment of the present disclosure, a method is provided of etching a glass material, the method comprising providing an etchant comprising 10-30% HF, 5-15% $HNO_3$, and at least 10% $H_3PO_4$ by volume. The etchant is also constituted such that the ratio $HF:HNO_3$ by volume is in the range of 1.7:1 to 2.3:1. The method further includes providing a glass material to be etched and contacting the glass material with the etchant.

As one alternative or addition to the method, the temperature of the etchant to a temperature within the range of 20-30° C., or to within the range of 22-28° C.

As another alternative or addition, the step of providing a glass material to be etched may comprise providing an aluminosilicate glass material to be etched, and may comprise providing an Eagle XG® glass material to be etched.

As yet other alternatives, the step of providing an etchant may include providing an etchant wherein the ratio $HF:HNO_3$ by volume is in the range of 1.8:1 to 2.2:1, or 1.9:1 to 2.1:1, or even 1.95:1 to 2.05:1.

As still other alternatives, the step of providing an etchant may include providing an etchant comprising at least 20% $H_3PO_4$, or even at least 40% $H_3PO_4$.

As yet more alternatives, the step of providing an etchant comprises providing an etchant may include providing an etchant comprising 15-25% HF and 7.5-12.5% $HNO_3$, or even 19-21% HF and 9.5-10.5% $HNO_3$.

As yet another aspect of the method, the step of providing an etchant may further include providing an etchant having no additional acid constituents other than HF, $HNO_3$, and $H_3PO_4$. As a related alternative aspect, water may be the only additional constituent other than HF, $HNO_3$, and $H_3PO_4$.

As another alternative addition to any of the various embodiments, ultrasound energy may be applied to the etchant or to the glass material or both.

EXAMPLES

Comparative Example 1

$HF+HNO_3$ Solution with No $H_3PO_4$ and No Ultrasound at 25° C.

One thousand (1000 ml) of solution which contained 20% by volume of HF and 10% by volume of $HNO_3$ was prepared in a 2000 ml beaker by first filling it with 700 ml of Deionized water (DIW). About 100 ml of 63% stock $HNO_3$ solution was added to the DIW followed by the addition of about 200 ml of a 49% HF stock solution. The final solution was allowed to stand in a water bath till it cooled down and the temperature was about 25±2° C. The solution concentration so prepared was 5.75M HF and 1.54 M $HNO_3$. Two 50 mm×50 mm Eagle XG® coupons were obtained and their thickness was measured. The coupons were etched at the same time in the solution for about 5 minutes with ultrasonic agitation. The etched samples were rinsed thoroughly in DIW, dried and their thickness was measured again. The etch rate was 4.5 μm per minute, determined by taking the ratio of amount of material removed to the residence time in the etch solution.

Comparative Example 2

$HF+HNO_3$ Solution with No $H_3PO_4$ with Ultrasound at 25° C.

One thousand (1000 ml) of solution which contained 20% by volume of HF and 10% by volume of $HNO_3$ was prepared in a 2000 ml beaker by first filling it with 700 ml of Deionized water (DIW). About 100 ml of 63% stock $HNO_3$ solution was added to the DIW followed by the addition of about 200 ml of a 49% HF stock solution. The final solution was allowed to stand in a water bath till it cooled down and the temperature was about 25±2° C. The solution concentration so prepared was 5.75M HF and 1.54M $HNO_3$.

Two 50 mm×50 mm Eagle XG® glass coupons were obtained and their thickness was measured. The coupons were etched at the same time in the solution for about 5 minutes this time using ultrasonic agitation at 40 kHz. The etched samples were rinsed thoroughly in DIW, dried and their thickness was measured again. The etch rate was 5.7 μm per minute, determined by taking the ratio of amount of material removed to the residence time in the etch solution.

Comparative Example 3

$HF+HNO_3$ Solution with No $H_3PO_4$ with Ultrasound at 40° C.

One thousand (1000 ml) of solution which contained 20% by volume of HF and 10% by volume of $HNO_3$ was prepared in a 2000 ml beaker by first filling it with 700 ml of Deionized water (DIW). About 100 ml of 63% stock $HNO_3$ solution was added to the DIW followed by the addition of about 200 ml of a 49% HF stock solution. The final solution was allowed to stand in a heated water bath till the etch solution temperature was stable at 40±2° C. The solution concentration so prepared was 5.75 M HF and 1.54 M $HNO_3$.

Two 50 mm×50 mm Eagle XG® glass coupons were obtained and their thickness was measured. The coupons were etched at the same time in the solution while keeping the temperature stable at about 40C for about 5 minutes, with ultrasonic agitation at 40 kHz. The etched samples were rinsed thoroughly in DIW, dried and their thickness was measured again. The etch rate was 8.1 μm per minute, determined by taking the ratio of amount of material removed to the residence time in the etch solution.

Disclosed Example 1

$HF+HNO_3$ Solution with 20% $H_3PO_4$ and No Ultrasound at 25° C.

One thousand (1000 ml) of solution which contained 20% by volume of HF and 10% by volume of $HNO_3$ was prepared in a 2000 ml beaker by first filling it with 500 ml of Deionized water (DIW). About 100 ml of 63% stock $HNO_3$ solution was added to the DIW followed addition of 200 ml of 85% stock $H_3PO_4$ solution. Finally 200 ml of 49% stock HF solution was added to obtain a final mixture consisting of 20%:10%:20% of $HF:HNO_3:H_3PO_4$ by volume. The final solution was allowed to stand in a water bath till it cooled down and the temperature was about 25±2° C. The solution concentration so prepared was 5.75M HF and 1.54M $HNO_3$ and 2.92M $H_3PO_4$.

Two 50 mm×50 mm Eagle XG® glass coupons were obtained and their thickness was measured. The coupons were etched at the same time in the solution for about 5 minutes without using ultrasonic agitation. The etched samples were rinsed thoroughly in DIW, dried and their thickness was measured again. The etch rate was 6.7 μm per minute, determined by taking the ratio of amount of material removed to the residence time in the etch solution.

Disclosed Example 2

HF+HNO₃ Solution with 40% $H_3PO_4$ and No Ultrasound at 40° C.

One thousand (1000 ml) of solution which contained 20% by volume of HF and 10% by volume of $HNO_3$ was prepared in a 2000 ml beaker by first filling it with 300 ml of Deionized water (DIW). About 100 ml of 63% stock $HNO_3$ solution was added to the DIW followed addition of 400 ml of 85% stock $H_3PO_4$ solution. Finally 200 ml of 49% stock HF solution was added to obtain a final mixture consisting of 20%:10%:40% of HF:$HNO_3$:$H_3PO_4$ by volume. The final solution was allowed to stand in a water bath till it cooled down and the temperature was about 25±2° C. The solution concentration so prepared was 5.75M HF and 1.54M $HNO_3$ and 5.85M $H_3PO_4$.

Two 50 mm×50 mm Eagle XG® glass coupons were obtained and their thickness was measured. The coupons were etched at the same time in the solution for about 5 minutes without using ultrasonic agitation. The etched samples were rinsed thoroughly in DIW, dried and their thickness was measured again. The etch rate was 8.1 μm per minute, determined by taking the ratio of amount of material removed to the residence time in the etch solution.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of embodiments that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims.

What is claimed is:

1. A method of etching a glass material comprising:
providing an etchant comprising 19-21% HF, 9.5-10.5% $HNO_3$, and at least 40% $H_3PO_4$ by volume, where HF corresponds to 49% HF, $HNO_3$ corresponds to 63% $HNO_3$ and $H_3PO_4$ corresponds to 85% $H_3PO_4$;
providing a glass material to be etched; and
contacting the glass material with the etchant.

2. The method according to claim 1, further comprising the step of controlling the temperature of the etchant to a temperature within the range of 20-30° C.

3. The method according to claim 1, wherein the step of providing a glass material to be etched comprises providing an aluminosilicate glass material to be etched.

4. The method according to claim 1 wherein the step of providing an etchant comprises providing an etchant containing only three acid components: HF, $HNO_3$, and $H_3PO_4$.

5. The method according to claim 1 wherein the step of providing an etchant comprises providing an etchant containing only water and three acid components: HF, $HNO_3$, and $H_3PO_4$.

6. The method according to claim 1, further comprising the step of controlling the temperature of the etchant to a temperature within the range of 22-28° C.

7. The method according, to claim 1, further comprising the step of applying ultrasound to the etchant.

8. The method according to claim 1, further comprising the step of applying ultrasound to the glass material to be etched.

* * * * *